United States Patent [19]

Parsons

[11] Patent Number: 4,926,811
[45] Date of Patent: May 22, 1990

[54] INTERNAL COMBUSTION ENGINES

[75] Inventor: Bryan N. V. Parsons, Stoney Stanton, United Kingdom

[73] Assignee: Jaguar Cars Limited, United Kingdom

[21] Appl. No.: 375,147

[22] Filed: Jun. 30, 1989

[30] Foreign Application Priority Data

Jul. 6, 1988 [GB] United Kingdom ............... 8816092

[51] Int. Cl.⁵ ............................................. F02F 5/00
[52] U.S. Cl. .................................. 123/193 P; 92/193; 92/201; 277/216
[58] Field of Search ......... 123/193 P, 193 CP, 193 R; 92/193, 201; 277/216, 218

[56] References Cited

U.S. PATENT DOCUMENTS 3,508,531  4/1970  Squinto et al. ................. 123/193 P
4,111,104  9/1978  Davison ......................... 123/193 P
4,367,702  1/1983  Lassanske .

Primary Examiner—Willis R. Wolfe
Assistant Examiner—M. Macy
Attorney, Agent, or Firm—Davis, Bujold & Streck

[57] ABSTRACT

An internal combustion engine includes a piston mounted for reciprocating motion within a cylinder and sealed with respect thereto. The piston is connected to a crankshaft by means of a connecting rod, pivotal connections being provided between the connecting rod and crankshaft and between the connecting rod and piston. An oil ring is provided in a circumferential groove in the wall of the piston, said oil ring being split so that there is a gap in the ring when it engages the wall of the cylinder. An interconnection is provided between the connecting rod and oil ring by which tilting of the connecting rod upon upward movement of the piston will reduce the gap so that the load applied by the oil ring on the cylinder wall is reduced, the oil ring being permitted to expand against the cylinder wall upon downward movement of the piston.

9 Claims, 2 Drawing Sheets

INTERNAL COMBUSTION ENGINES

BACKGROUND TO THE INVENTION

The present invention relates to internal combustion engines and in particular to oil rings used on the pistons of such engines.

On a conventional internal combustion engine, the pistons are mounted for reciprocating motion in cylinder bores and are sealed with respect thereto by one or more piston rings located within circumferential grooves adjacent the head of the piston. Lubrication of the cylinder walls is conventionally achieved by means of the oil mist which is produced within the crankcase. An oil ring is normally located in a circumferential groove below the piston rings and on the downstroke of the piston will control the film of oil on the cylinder wall, so that there is sufficient oil to minimise wear while excess oil will not pass the piston rings to be burnt in the cylinder. Such oil rings are formed from resilient metal and are split so that they engage the wall of the cylinder under compression. The outer face of the oil ring which engages the cylinder wall has upper and lower lip formations with a recess therebetween, apertures being provided in the recess and through the piston wall for return of excess oil. In a typical engine of this form, the oil ring may contribute up to 30% of the total engine frictional forces.

The present invention provides means for reducing the frictional forces produced by the oil ring.

SUMMARY OF THE INVENTION

According to one aspect of the present invention an internal combustion engine comprises a cylinder, a piston mounted for reciprocating motion within the cylinder and sealed with respect thereto, the piston being connected to a crankshaft by means of a connecting rod which is pivotally attached at opposite ends to the piston and to the crankshaft, an oil ring being provided in a circumferential groove in the wall of the piston, said oil ring being split so that there will be a gap in the ring when it engages the wall of the cylinder and means being provided to reduce the width of the gap, upon upward movement of the piston.

The present invention consequently provides an internal combustion engine, in which engagement of the oil ring with the cylinder wall may be avoided on upward movement of the piston, thereby reducing the frictional effect of the oil ring by of the order of 50%. As the oil ring performs its function on the downward stroke of the piston, this invention will not adversely effect the functioning of the oil ring.

According to a preferred embodiment, pivotting movement of the connecting rod relative to the piston is used to reduce the width of the gap of the oil ring.

The invention is now described, by way of example only, with reference to the accompanying drawings, in which:

DESCRIPTION OF A PREFERRED EMBODIMENT

Figure 1:
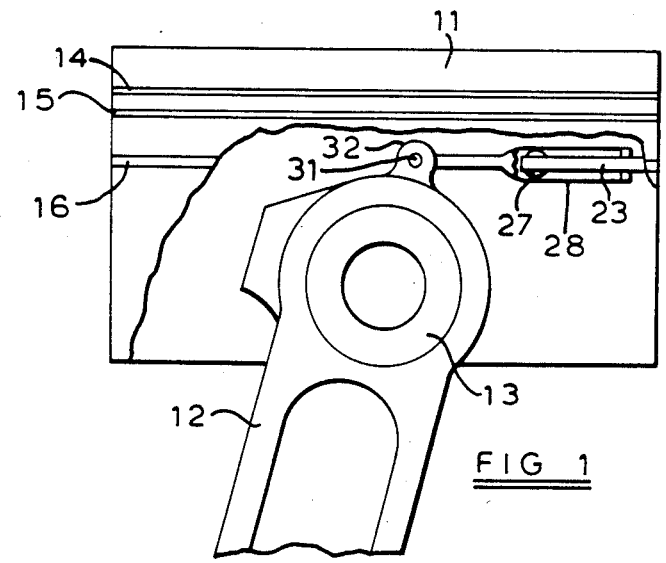
FIG. 1 shows a sectional side elevation of the piston and connecting rod of an engine formed in accordance with the present invention.
Figure 2:
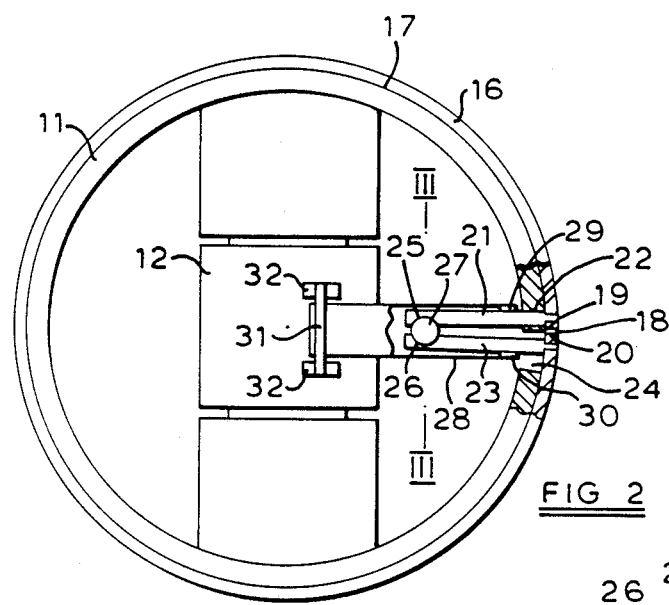
FIG. 2 shows a sectional plan view of the assembly illustrated in FIG. 1.
Figure 3:
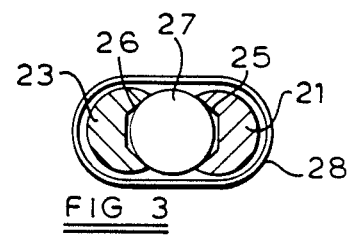
FIG. 3 shows a section along the line III—III of FIG. 2.

As illustrated in the drawings, the piston 11 is pivotally connected to the small end of a connecting rod 12 by means of gudgeon pin 13, in conventional manner. The piston 11 has a pair of piston rings 14 and 15 mounted in circumferential grooves in the wall of the piston.

An oil ring 16 is mounted in a circumferential groove 17 in the wall of the piston 11, below the piston rings 14 and 15. The oil ring 16 is made of resilient material and is split so that when the piston is located within a cylinder, the oil ring 16 will engage the wall of the cylinder under compression with a gap 18 between opposed ends 19 and 20 of the ring 16.

A rod 21 is located transverse to the axis of the gudgeon pin 13 through a hole 22 in the cylinder wall and is pinned to end 19 of the oil ring 16. A second rod 23 in juxtaposed position to rod 21 passes through a circumferential elongate slot 24 in the cylinder wall and is pinned to end 20 of the oil ring 16. A pair of opposed frustroconical recesses 25 and 26 are provided in rods 21 and 23 adjacent the ends thereof remote from the ends pinned to ring 16 and a ball 27 is located within the recesses 25 and 26 to provide a pivot for rod 23 relative to rod 21.

The rods 21 and 23 are slidingly located within a tubular member 28, abutment formations 29 and 30 being provided at one end of the tubular member 28 for engagement of the rods 21 and 23. The other end of tubular member 28 is pivotally attached to the small end of connecting rod 12 by means of a pin 31 which locates in lugs 32.

The rods 21 and 23 are positioned on the side of the gudgeon pin 13 opposite that to which the connecting rod 12 tilts upon upward movement of the piston 11. Consequently, as the piston 11 begins its upward movement and the connecting rod 12 begins to tilt, the tubular member 28 will slide along the rods 21 and 23 towards the cylinder wall and rod 23 will be pivotted about the ball 26 towards rod 21. This movement of rod 23 will draw the ends 19 and 20 of the oil ring 16 together, reducing the gap 18 and the diameter of the oil ring 16, so that the oil ring 16 will move out of engagement with the wall of the cylinder. As the piston 11 approaches top dead centre, the connecting rod 12 will pivot back and draw the tubular member 28 away from the cylinder wall. This movement of the tubular member 28 will allow rod 23 to pivot away from rod 21 increasing the gap 18, until at top dead centre, the oil ring 16 will again engage the cylinder wall and function in normal manner on the downstroke of the piston.

Figure 4:
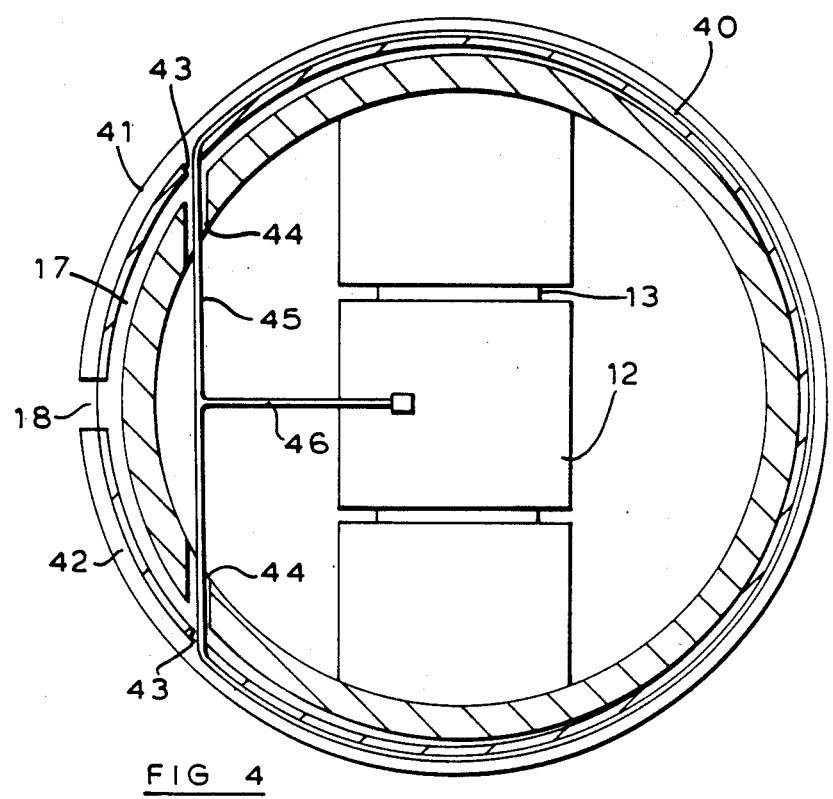
FIG. 4 shows in sectional plan view an alternative piston/connecting rod assembly of an engine formed in accordance with the present invention.

In the embodiment illustrated in FIG. 4 a flexible wire loop 40 is located around oil ring 41 in a circumferential groove 42 in the external face of the oil ring 41. Adjacent both ends of the oil ring 41, the wire loop 40 passes through apertures 43 in the oil ring 41 and elongate apertures 44 in the underlying portion of the piston wall, to form a chordal portion 45 bridging the gap 18 between the ends of oil ring 41.

The wire loop 40 is dimensioned so that when it is taut, the diameter of the oil ring 42, which is made of resilient material, will be slightly greater than that of the cylinder, so that when the piston is located within the cylinder the oil ring 42 will resiliently engage the walls of the cylinder.

The chordal portion 45 of wire loop 40 and the gap 18 are positioned on the side of the gudgeon pin 13 to which the connecting rod 12 tilts upon upward movement of the piston 11. A length of wire 46 interconnects the chordal portion 45 of the wire loop 40 to a lug 46 on the end of connecting rod 12, so that as the piston 11 begins its upward movement the wire 46 will pull on the chordal portion 45 and draw the ends of the oil ring 16 together, closing the gap 18 and reducing the load applied by oil ring 16 on the cylinder wall. As the piston 11 approaches top dead centre the load on the chordal portion 45 is released so that on the down stroke, the oil ring 16 is in full engagement with the cylinder wall.

Various modifications may be made without departing from the invention. For example, in the embodiment illustrated in FIG. 4, rather than using a wire loop 40, a wire defining the chordal portion 45 may be secured at each end to the oil ring 16. Also while in the embodiments described the means for reducing the width of the gap 18 of oil ring 16 is connected to the upper end of the connecting rod 12, this connection may be made to any suitable part of the connecting rod or any other component which moves relative to the piston, the means for reducing the gap being positioned appropriately so that this relative motion will reduce the gap upon upward movement of the piston.

I claim:

1. An internal combustion engine comprising a cylinder, a piston mounted for reciprocating motion within the cylinder and sealed with respect thereto, the piston being connected to a crankshaft by means of a connecting rod which is pivotally attached at opposite ends to the piston and to the crankshaft, an oil ring being provided in a circumferential groove in the wall of the piston, said oil ring being split so that there will be a gap in the ring when it engages the wall of the cylinder and means being provided to reduce the width of the gap, upon upward movement of the piston.

2. An internal combustion engine according to claim 1 in which the pivotting of the connecting rod relative to the piston is used to reduce the width of the gap in the oil ring upon upward movement of the piston.

3. An internal combustion engine according to claim 2 in which radially inwardly extending levers are attached to each end of the oil ring, the levers being pivotted with respect to one another at a position remote from the connection thereof with the oil ring, and means being provided to pivot the levers towards one another upon upward movement of the piston and away from one another upon downward movement of the piston.

4. An internal combustion engine according to claim 3 in which one lever is mounted in fixed relationship to the piston, passing through a hole in the piston to engage the oil ring while the other lever passes through an elongate hole in the piston to engage the oil ring.

5. An internal combustion engine according to claim 3 in which a ball is located in opposed recesses in the two levers to provide a pivot therebetween.

6. An internal combustion engine according to claim 3 in which a tubular member is slidingly located over the levers and is connected to the connecting rod, so that upon upward movement of the piston the tubular member will slide towards the piston wall thus drawing the levers together and reducing the gap in the oil ring and upon downward movement of the piston will slide away from the piston wall thus permitting the levers to move apart and increase the gap between the ends of the oil ring.

7. An internal combustion engine according to claim 2 in which a flexible element is disposed chordally across the ends of the oil ring, the flexible element being connected to the connecting rod, so that tilting of the connecting rod upon upward movement of the piston will pull the flexible element drawing the ends of the oil ring together.

8. An internal combustion engine according to claim 7 in which the flexible element is part of a continuous loop which passes around the oil ring and is disposed within a groove in the external face thereof, the loop passing through apertures adjacent the ends of the oil ring and in the underlying piston wall.

9. An internal combustion engine according to claim 4 in which a ball is located in opposed recesses in the two levers to provide a pivot therebetween.

* * * * *